United States Patent
LaManna et al.

(10) Patent No.: US 8,539,473 B2
(45) Date of Patent: Sep. 17, 2013

(54) TECHNIQUES FOR PROVIDING INFORMATION REGARDING SOFTWARE COMPONENTS FOR A USER-DEFINED CONTEXT

(75) Inventors: Michael LaManna, Bothell, WA (US); Alex Aben-Athar Kipman, Duvall, WA (US); Erik Neuenschwander, Seattle, WA (US); Letha Radebaugh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1668 days.

(21) Appl. No.: 11/699,631

(22) Filed: Jan. 30, 2007

(65) Prior Publication Data
US 2008/0184222 A1     Jul. 31, 2008

(51) Int. Cl.
*G06F 9/45*   (2006.01)

(52) U.S. Cl.
USPC .......... 717/169; 717/168; 717/170; 717/172; 715/733; 715/744; 715/747

(58) Field of Classification Search
USPC ................................ 717/168–178
See application file for complete search history.

(56) References Cited

U.S. PATENT DOCUMENTS

| | | | |
|---|---|---|---|
| 5,588,143 A | 12/1996 | Stupek, Jr. et al. | |
| 5,754,175 A * | 5/1998 | Koppolu et al. | 715/744 |
| 5,841,435 A * | 11/1998 | Dauerer et al. | 715/775 |
| 5,859,969 A * | 1/1999 | Oki et al. | 709/200 |
| 6,151,643 A | 11/2000 | Cheng et al. | |
| 6,353,926 B1 | 3/2002 | Parthesarathy et al. | |
| 6,360,366 B1 | 3/2002 | Heath et al. | |
| 6,557,054 B2 | 4/2003 | Reisman | |
| 6,735,766 B1 | 5/2004 | Chamberlain et al. | |
| 6,744,450 B1 * | 6/2004 | Zimniewicz et al. | 715/841 |
| 6,976,062 B1 | 12/2005 | Denby et al. | |
| 6,990,660 B2 | 1/2006 | Moshir et al. | |
| 7,073,172 B2 | 7/2006 | Chamberlain | |
| 7,093,246 B2 | 8/2006 | Brown et al. | |
| 7,096,465 B1 * | 8/2006 | Dardinski et al. | 717/178 |
| 7,117,355 B2 | 10/2006 | Zomaya et al. | |
| 7,254,631 B2 * | 8/2007 | Crudele et al. | 709/224 |
| 7,478,329 B2 * | 1/2009 | Stevens et al. | 715/734 |
| 7,631,267 B2 * | 12/2009 | Viji et al. | 715/763 |
| 7,721,284 B2 * | 5/2010 | Bykov et al. | 717/178 |
| 7,958,504 B2 * | 6/2011 | Crudele et al. | 717/172 |

(Continued)

FOREIGN PATENT DOCUMENTS

EP   0703531 A1   3/1996
WO   WO0193021 A2   12/2001

OTHER PUBLICATIONS

"Windows Vista Ultimate: Windows Ultimate Extras", http://www.vistaultimate.com/windows_ultimate_extras.htm.

(Continued)

*Primary Examiner* — Wei Zhen
*Assistant Examiner* — Matthew Brophy

(57) ABSTRACT

Techniques are described for providing information about installation states of software components using an interactive object. Information regarding one or more classifications is received. Each of the classifications indicates a different installation state. At least a portion of the information is displayed in a first area of the interactive object. A selectable element is included in the interactive object which, when selected, causes performance of an action.

20 Claims, 11 Drawing Sheets

(56) References Cited

U.S. PATENT DOCUMENTS

| | | | |
|---|---|---|---|
| 8,315,907 B2* | 11/2012 | Shaughnessy et al. | 705/14.69 |
| 2003/0229890 A1 | 12/2003 | Lau et al. | |
| 2004/0073636 A1* | 4/2004 | S. Chase-Salerno et al. | 709/222 |
| 2005/0125509 A1 | 6/2005 | Ramachandran | |
| 2006/0184931 A1* | 8/2006 | Rochette et al. | 717/169 |
| 2006/0228690 A1 | 10/2006 | Lund | |
| 2007/0256070 A1* | 11/2007 | Bykov et al. | 717/174 |
| 2008/0005679 A1* | 1/2008 | Rimas-Ribikauskas et al. | 715/745 |
| 2008/0115124 A1* | 5/2008 | Remer | 717/178 |
| 2008/0163092 A1* | 7/2008 | Rao | 715/771 |
| 2008/0184222 A1* | 7/2008 | LaManna et al. | 717/174 |
| 2009/0118846 A1* | 5/2009 | Eldridge et al. | 700/86 |
| 2009/0193410 A1* | 7/2009 | Arthursson et al. | 717/173 |
| 2009/0276318 A1* | 11/2009 | Broadbent et al. | 705/14.64 |

OTHER PUBLICATIONS

Ajmani, Sameer, "A Review of Software Upgrade Techniques for Distributed Systems", Date: Aug. 7, 2002, http://www.pmg.lcs.mit.edu/~ajmani/papers/review.pdf.

Baumann, Andrew, "Improving Operating System Availability With Dynamic Update", Date: Oct. 2004, http://www.ertos.nicta.com.au/publications/papers/Baumann_ADKW_04.pdf.

Dunagan, et al., "Towards a Self-Managing Software Patching Process Using Black-Box Persistent-State Manifests", Date: Mar. 21, 2004, ftp://ftp.research.microsoft.com/pub/tr/TR-2004-23.pdf.

* cited by examiner

TECHNIQUES FOR PROVIDING INFORMATION REGARDING SOFTWARE COMPONENTS FOR A USER-DEFINED CONTEXT

BACKGROUND

An initial set of software may be installed on a computer system. Subsequently, updates to the initial installation may become available. The updates may relate to corrections or bug fixes as well as improvements or additional features in connection with a wide variety of different areas. The foregoing software updates, such as operating system updates, may be downloaded and installed in an automated fashion with minimal disruption. Besides updates, there may be other software, such as a new application, which may be used on a computer system and which becomes available subsequent to the initial installation. While installing updates in an automated fashion may be desirable, automated installation may not be desirable in connection with other types of software such as a new application. Furthermore, a user may not even be aware of what additional software is available for a computer system. One existing technique may include manually monitoring software vendors or other providers for additional software. However, such monitoring can be cumbersome and also requires user knowledge of what websites, publications, and the like, should be monitored. Information may also be needed regarding the functionality of the additional software to facilitate in determining whether to install the software. Obtaining the appropriate information to facilitate making such a determination can also be time consuming and cumbersome.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described herein for providing information about installation states of software components using an interactive object. At least a portion of the information is displayed in a first area of the interactive object. A selectable element may also be included in the interactive object which, when selected, causes performance of an action. A set of one or more object states may be received in which each of the one or more object states corresponds to a different rendering of the interactive object and communicates a different portion of received information received. A different portion of the set of one or more object states may be associated with each of the one or more classifications. Processing may be performed to cycle through the one or more object states each causing a different rendering of the interactive object.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
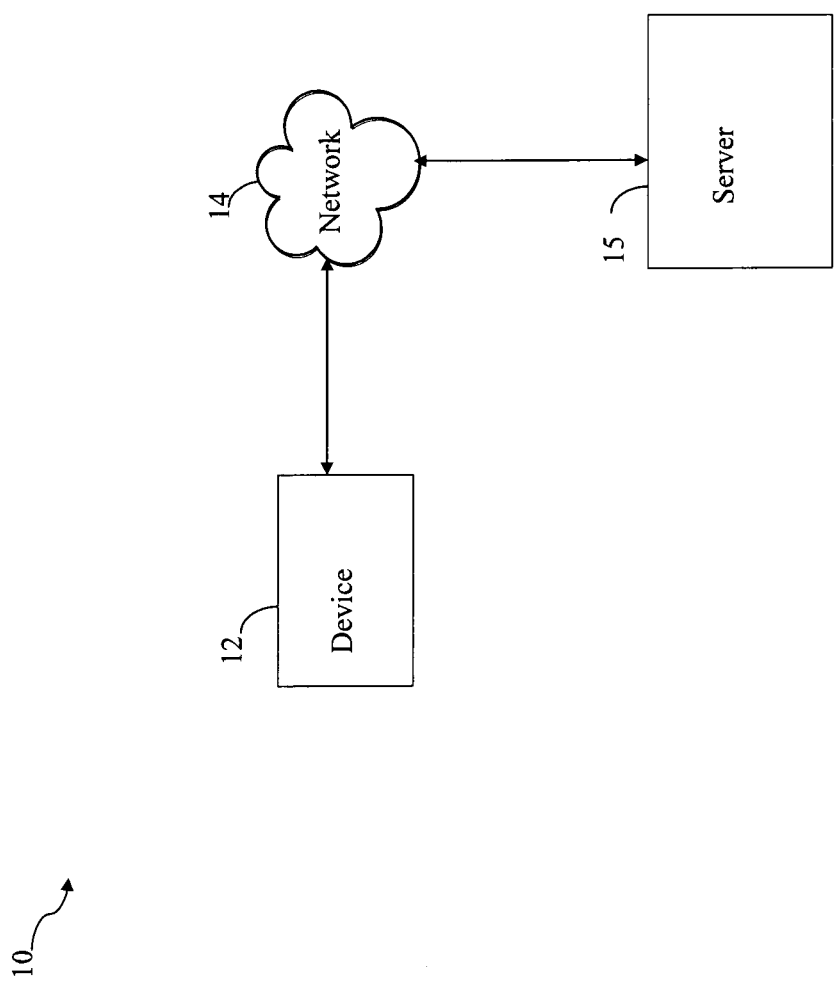
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with providing information about software states and associated classifications or categories of software. The techniques herein may also be used to facilitate user interaction and input selection for processing related to the software. The software may include, for example, new applications, applets and the like, for use on a computer system. The classifications or categories of the software may relate to states of the software. Such states may include, for example, software currently installed on a device, software currently available for installation, software not installed on a device but currently available, and software which will be available at a future date. A classification may be defined which includes software components of one or more such states. The techniques may provide information and interaction from the desk top using the interface described herein in one embodiment. As used herein, a software component may include any one or more different types and forms of software such as, for example, an application, applet, icon, gadget, script, library, source code, binary code, and the like. The software components may provide for example, value-added functionality, services, and features.

Techniques are described herein that may be used in connection with providing information about software to a user. In accordance with one aspect, notification may be provided regarding software components such as those which are currently available for installation on a computer system or other device, as well as software components which will be available at a future date. In accordance with another aspect, the techniques herein may be used to facilitate navigation to a location for downloading and installing a software component and providing a description regarding functionality of the software components. The techniques herein facilitate examination of a collection of software components, such as installed software components. The techniques herein may be used to perform other processing for each software components in the collection such as, for example, easily launching the software component, navigating to a location with information about the software component, and the like.

The techniques herein may be used to provide a streamlined process for facilitating communications and interactions with a user regarding software from the desk top. The techniques may be used in providing information regarding such software to assist in informing and educating the user about functionality of the software and facilitate taking a user selected action such as, for example, downloading and installing of the software.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Included in FIG. 1 are a device 12, a network 14, and a server 15. The device 12 may be, for example, a computer, such as a personal computer, having a display output device and an input device providing for interactive I/O with a user thereof. In following paragraphs, additional details are provided with respect to the device 12. However, the same details may also apply to one or more other devices that may be connected to the network 14 in an embodiment. Although the example 10 of FIG. 1 includes only a single device and a single server, an embodiment utilizing the techniques herein may include any number of devices and other components.

The device 12 included in FIG. 1 is exemplary for purposes of illustrating the techniques described herein in connection with software components. In one embodiment, any device 12 providing the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the server 15 and other computers or components not shown in FIG. 1. As described herein, the device 12 may be a personal computer. In other embodiments, the functionality of device 12, or the device 12 itself, may be included in another component in accordance with a particular environment in which the device 12 is utilized.

The server 15 may communicate with device 12 when connected to the network 14. The server 15 may include one or more applications and associated data for use in connection with communications to device 12. For example, the server 15 may host a server portion of an electronic calendar and messaging program, and other applications. The device 12 may include a client-side application for use with the server-side electronic calendar and messaging program, a browser, and the like. When the device 12 is connected to the server 15, the device 12 communicates with the respective server-side application and may also utilize data stored at the server 15. As one example, the techniques herein may be used in connection with providing information regarding a new client-side application available for download and installation from the server 15. Notification may be provided to a user of device 12 regarding the new client-side application. Additionally, the techniques herein may be used to navigate a user to information regarding new application and to facilitate downloading and installation thereof.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s) to the server 15 and/or other components.

It should also be noted that although the device 12 is illustrated as having network connectivity to the server 15, the techniques described herein may be used in connection with a device directly connected to the server 15 without a network.

Figure 2:
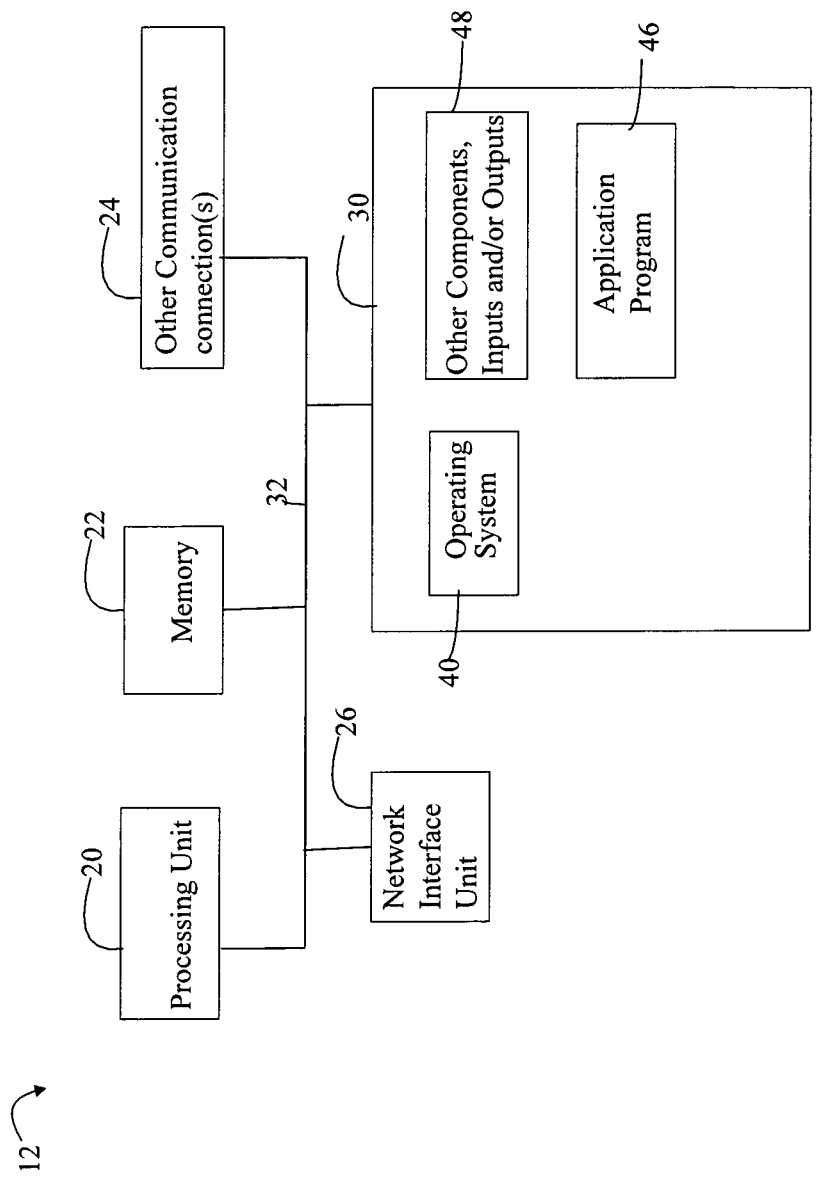
FIG. 2 is an example of components that may be included in an embodiment of a device for use in connection with performing the techniques described herein.

Referring now to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media can be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The device 12 may also contain communications connection(s) 24 that allow the computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, one or more application programs 46, and other components, inputs, and/or outputs 48. In one embodiment, the application program 46 may be a web browser, a client-side application, or other application used when operating the device 12 standalone and/or with external connectivity.

The operating system 40 may be any one of a variety of commercially available or proprietary operating systems. In one embodiment, the operating system 40 may be the Microsoft Windows Vista™ operating system. The operating system 40, for example, may be loaded into memory in connection with controlling operation of the user computer. One or more application programs 46 may execute in the device 12 in connection with performing user tasks and operations.

In one embodiment as described herein, the device 12 may be a computer such as a personal computer. However, the foregoing should not be construed as a limitation of the techniques herein which, as will be appreciated by those skilled in the art, may be utilized with a wide variety of devices capable of performing the processing described herein.

Figure 3:
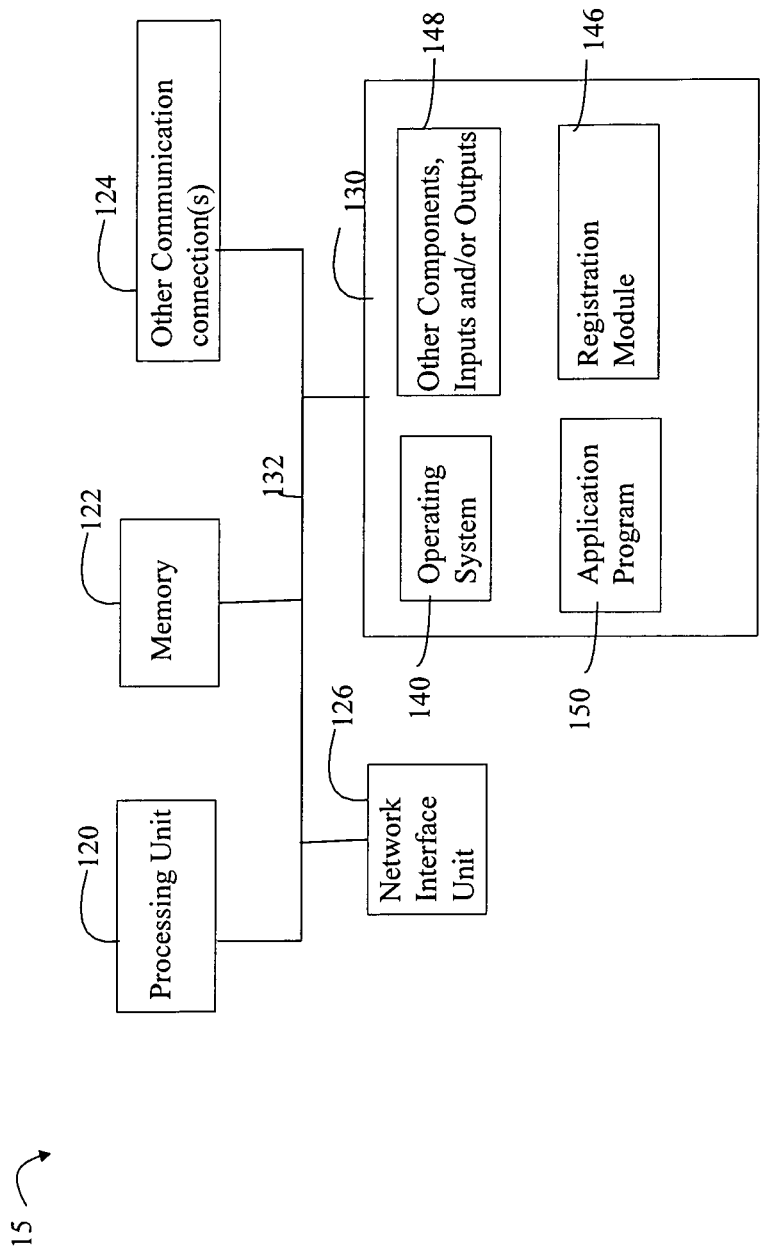
FIG. 3 is an example of components that may be included in an embodiment of a server for use in connection with performing the techniques described herein.

Referring now to FIG. 3, shown is an example of components that may be included in the server 15 and used in connection with performing the various embodiments of the techniques described herein. In one embodiment the server 15 may include one or more operating systems 140, one or more application programs 150, a registration module 146 and other components, inputs and/or outputs 148. As illustrated in FIG. 3, an embodiment of the server 15 may include components similar to those described in connection with FIG. 2. Additionally, the server 15 may include a registration module 146 for registering one or more users of the server. In one embodiment, a user of the device 12 may be registered. Each user may have an electronic email account, a calendar, and the like. Information for each of the foregoing may be maintained at the server 15. The registration module 146 may be used in connection with registration of a user. As part of the registration process, the user may be assigned a user identifier, an associated email account, and the like. In order to access the server 15 and/or utilize components and services included thereon, a user may provide authentication information associated with a particular account for the user. A user may also be registered to use one or more services provided by the server.

The server 15 may also include one or more applications 142, such as server-side applications, which may be accessed and executed when device 12 is connected to the server 15. The application 142 may perform, for example, a service, for a registered user of a connected device 12. The server 15 may include client-side software components, such as application programs, which may be downloaded and installed on a device 12 of a registered user.

In one embodiment, the device 12 may be executing the Windows Vista™ operating system by Microsoft Corporation. One particular edition of the foregoing operating system is the Microsoft Vista Ultimate™ edition providing the user with various supplemental components including additional software components, such as new applications and functionality, subsequent to the purchase and installation of the operating system. The foregoing additional software components may be of a type for which automated downloading and installation as the components become available may not be desirable. For example, a new software component providing a new game or utility may become available. A user may want to receive notification of the new software component and review information about the functionality regarding the new component. The information may be used to assist in making a determination as to whether a user wants to download and install the new component. In connection with the Microsoft Vista Ultimate™ edition, the foregoing new software component, such as a new game, service, or other utility, may be referred to as a Windows Ultimate Extra™ and may be made available to owners of the Microsoft Vista Ultimate™ edition. The owners may be provided with the additional software components and other Windows Ultimate Extras™. Described in following paragraphs is an exemplary use of the techniques herein in connection with Windows Ultimate Extras™. The examples set forth herein should not be construed as a limitation of the techniques described which may be used in connection with all types of software components including those providing value-added functionality, services, and features, such as the Windows Ultimate Extras™, as well as other types.

In one embodiment, functionality included in the Windows Vista™ operating system may be used to provide an interface to facilitate communications and interactions with a user regarding the additional software components, such as Windows Ultimate Extras™. One embodiment of the techniques herein may utilize the Windows Sidebar and Gadget functionality to notify the user regarding Windows Ultimate Extras™ or other additional software components, for example, such as software components available for download and installation, software components currently installed on the user's computer, software components which are available but not currently installed on the user's computer, and software components which are not yet available but will be released at a future date. Additionally, besides providing notification, the foregoing functionality may also be used to facilitate user interaction and selections in connection with the software components to navigate a user to an appropriate location for purposes of reviewing additional descriptive information, downloading and installing the component, and other actions.

A gadget may appear as an object located on the desk top and may have interactive capabilities. The gadget may display changing content, such as various images, text, multimedia data, and the like, which change over time or in response to user interaction and selection. In response to a user selection or input, the gadget may also be used to perform an action in accordance with the particular input. Such actions may include, for example, navigating to a particular location such as a website location, launching a program, displaying text and/or images providing information, initiating download and installation of a software component, and the like. In connection with the techniques herein, the gadget may be included in a pane or designated portion of a desktop display such as the Windows Sidebar. In one embodiment, the Windows Sidebar is a pane on the side of the desk top that can be used to organize gadgets.

Gadgets may be characterized as mini-applications, task-specific applets and the like, with a wide variety of uses. In one embodiment, gadgets may be created using a published interface or API with associated routines included in the Sidebar SDK and Gadget SDK utilizing functionality included in the Windows Vista™ operating system from Microsoft Corporation.

Gadgets for the Windows Sidebar may reside on the local computer. The gadgets may be acquired, for example, when a user downloads them from a website, installs gadgets from a CD or other media such as in connection with an operating system, installs gadgets as an optional update, develops his/her own task-specific gadget such as to perform the techniques herein, and the like.

Each gadget has the ability to respond to user interaction. That interaction may be, for example, the result of clicking within the gadget on buttons, images or text, or by moving the gadget around the screen. In response to the foregoing interaction events, scripts may be used to accordingly change the gadget's appearance.

In connection with using the functionality of the Windows Vista™ operating system and interfaces, each gadget may be developed using HTML and script and various files such as, for example, a gadget manifest, an HTML file and HTML settings file, and the like. The gadget manifest may be characterized as an XML file defining the gadget properties, including name, icon, and description. The HTML file includes coding for the gadget user interface. The HTML settings file is for use in connection with the previous HTML file. Additional files used in connection with the gadget may include images, script (encapsulating the gadget's logic), and style sheets as well as an icon used to represent the gadget in a list of available gadgets. The files associated with a gadget may be included in a separate file or folder.

In connection with the techniques and embodiment herein, the gadget may appear on the desk top in the Windows Sidebar and may include code portions which perform processing in accordance with the techniques herein.

It should be noted that although described herein is a particular embodiment utilizing gadgets and functionality included in a particular operating system, those skilled in the art will appreciate that the techniques herein may be implemented utilizing other programming languages and functionality that may be available and vary with each embodiment.

Using the gadget as the user interface in one embodiment in which the device 12 is a computer, a user of the computer may be provided with information regarding the Windows Ultimate Extras™ or other software components. The gadget may be used to provide information about various states and associated classifications of the Ultimate Extras such as, for example, Ultimate Extras currently installed on the computer, Ultimate Extras currently available for installation, Ultimate Extras not installed on the computer but currently available, and/or Ultimate Extras which will be available at a future date. The gadget may also be used to inform the user regarding which particular Ultimate Extras are included in one of the foregoing states or classifications. Furthermore, the gadget may be used to provide information to a user regarding a particular Ultimate Extra or take some other action in response to a user input. For example, the gadget may be used to facilitate navigation to a website or other location in a manner similar to that of a web browser using a hyperlink, initiate processing for downloading and installing an Ultimate Extra, launch an already-installed Ultimate Extra, display text providing information, and the like. The techniques may provide such information and interaction from the desk top using the interface described herein.

A gadget may be in one of two modes with respect to the Windows Sidebar referred to herein as docked or anchored, and undocked or unanchored. In the docked or anchored mode, the gadget may be located within the Windows Sidebar in which the gadget utilizes a fixed amount of space. The gadget may appear in a compressed form in contrast to the amount of screen space utilized in connection with the undocked or unanchored mode. In the undocked mode, the gadget may be detached from the Windows Sidebar and may be moved freely on the desk top. In the undocked mode, the gadget may be in an expanded form occupying more screen space than when in the docked mode on the Windows Sidebar.

Figure 4:
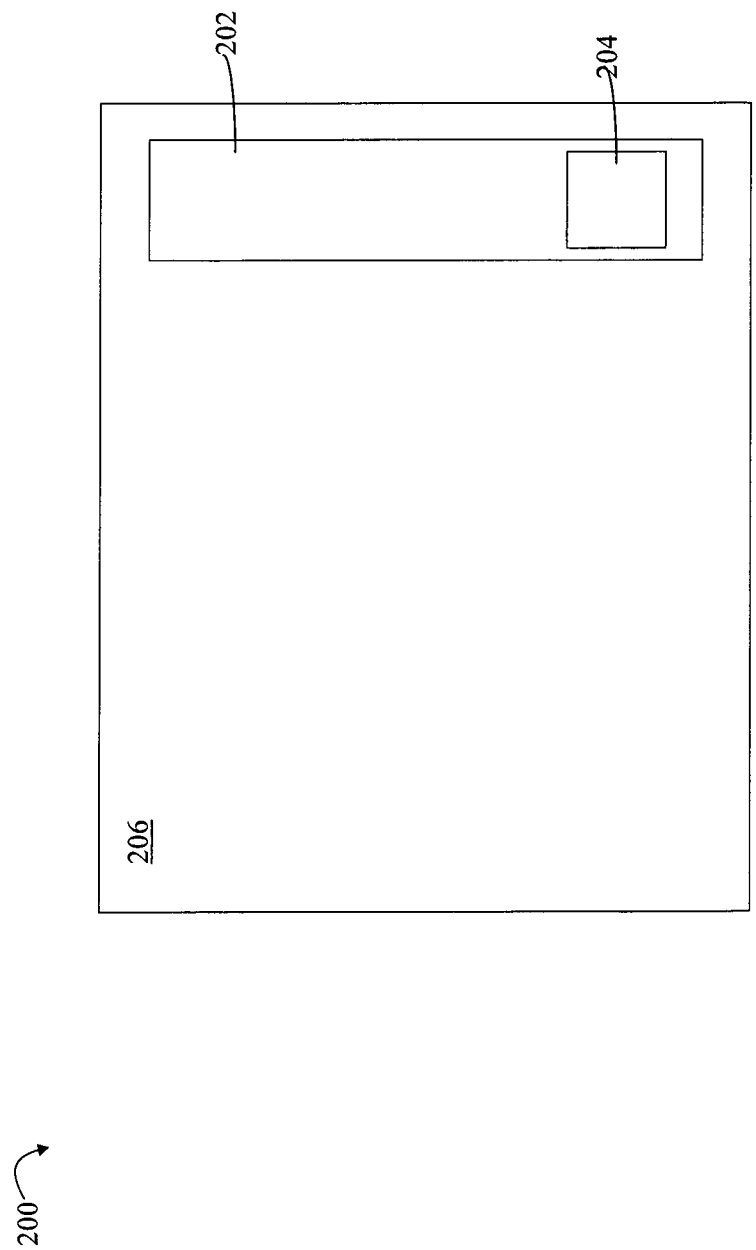
FIG. 4 is an example illustrating a gadget included in the desk top in docked mode.

Referring now to FIG. 4, shown is an example illustrating a screenshot in connection with the docked mode. In the example 200, the desk top 206 may include a Windows Sidebar 202. The gadget 204 may be located in the area 202 in a compressed form.

Figure 5:
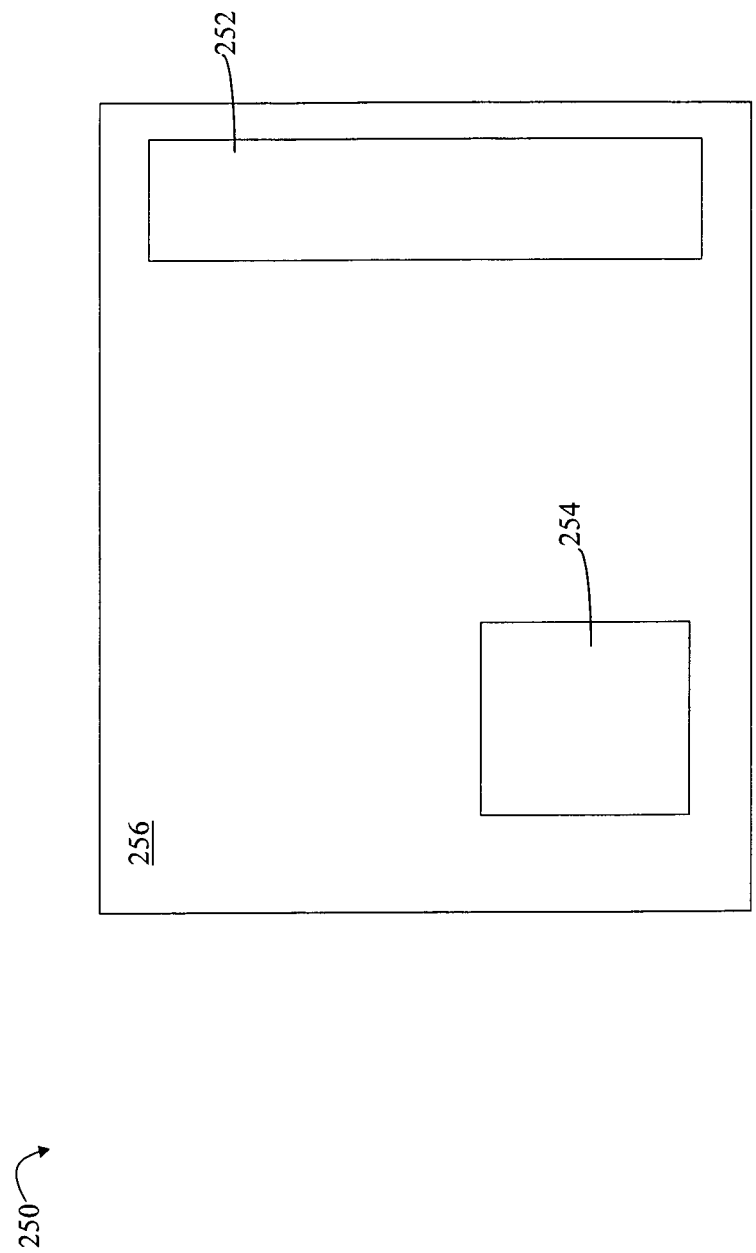
FIG. 5 is an example illustrating a gadget included in the desk top in undocked mode.

Referring now to FIG. 5, shown is an example illustrating a screenshot in connection with the undocked mode. In the example 250, the desk top 256 may include a Windows Sidebar 252. The gadget 254 may be located in an area of the desk top 256 other than 252 and may be in an expanded form.

In connection with the techniques herein, the gadget may be used to communicate information regarding one or more states and associated classifications of additional software components, such as the Windows Ultimate Extras™. By default, such as without intervening user selection or action, the gadget may cycle through one or more gadget states. Each gadget state may cause a change in the display or visual appearance of the gadget. In one embodiment, the state of the gadget may be represented using two levels of cycling. A first level may represent the classification of the additional software components about which information is being communicated. A second level may represent a particular software component within the current classification of the first level. The gadget may cycle through gadget states corresponding to a numeric pairing represented as (first level, second level) in which the second level is cycled prior to incrementing the first level.

Figure 5A:
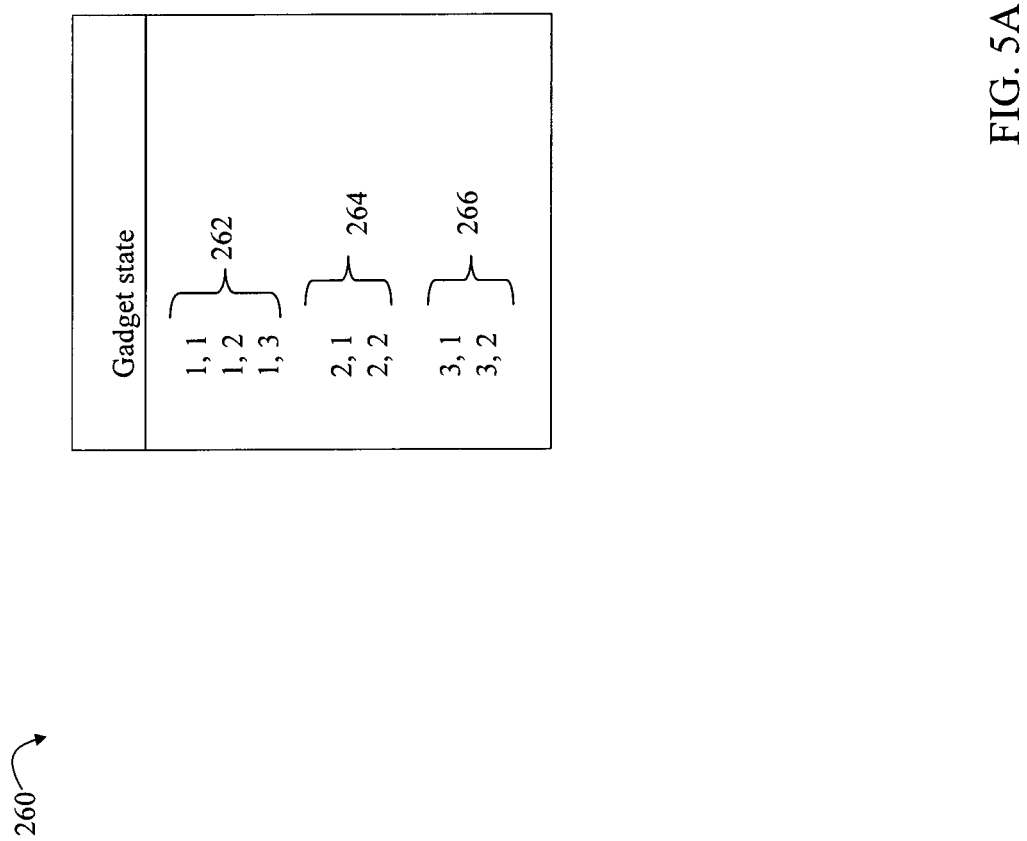
FIG. 5A is an example illustrating various gadget states.

Referring now to FIG. 5A, shown is an example illustration representing the various gadget states through which a gadget may cycle. In the example 260, a table is used to represent example first and second level values. The example illustrates an instance in which there are three software component states and three corresponding classifications such as, for example, Ultimate Extras currently installed on the computer, Ultimate Extras currently available for installation, Ultimate Extras not installed on the computer but currently available. The Ultimate Extras currently available for installation may be a collection of all Ultimate Extras available or those which may be characterized as "new" or first becoming available within a defined time period, such as, for example, within the last 30 days. An embodiment may include other software component classifications and states such as, for example, Ultimate Extras which are not currently available but will be at a future point in time. In this latter instance, the gadget may be used to promote new and upcoming software components as a form of advertisement.

In the example illustrated in connection with FIG. 5A, there may be three classifications each having corresponding gadget states respectively represented by 262, 264 and 266. In connection with software currently installed on the computer 12, there may be 2 Ultimate Extras of the first classification, and 1 Ultimate Extra included in each of the second and third classifications. For each of the classifications, a summary display may also be rendered using the gadget. A gadget state may be defined for each summary display for each classification. For example, the first classification may correspond to those Ultimate Extras which are new or have been made available for download and installation within the last month. The gadget may have a first gadget state corresponding to 1, 1 of the example 260 in which the gadget displays summary information indicating that there are 2 Ultimate Extras in this first classification. The gadget state 1, 2 may correspond to a display of information regarding the first Ultimate Extra of the first classification. The gadget state 1, 3 may correspond to a display of information regarding the second Ultimate Extra of the first classification. An embodiment may also not include such summary information as may be appropriate for the particular software component classification. The gadget states associated with the first software component classification are indicated by 262. Similarly, in this example, the gadget states associated with the second and third software component classifications, respectively, are indicated by 264 and 266. In the foregoing example, the gadget states may provide for cycling through information regarding the various software components included in a particular classification similar to a flip through of each of the software components included in the classification. A gadget state is included and denoted using the second level notation for each software component to provide information about the software component as part of the flip through processing.

It should also be noted that a software component classification may also only have a single gadget state. For example, for the foregoing first software component classification, an embodiment may have a single gadget state corresponding to the summary information. In another variation, if software component classification includes one or more elements, an embodiment may have gadget states for each individual component classification without providing a gadget state for the summary information. If there are no components in the classification, there may be a single gadget state corresponding to the classification and indicating that no software components are currently included therein.

As the number and particular software components in each of the different software component classifications changes, so may the cycle and defined gadget states. For example, the number of components in a classification may change as new software components are installed or become available. Accordingly, the number of gadget states may also change. Although examples are provided herein with a particular number of software component classifications, an embodiment may include any number of software component classifications.

It should also be noted that an embodiment may define a software component classification which includes a combination of various software component states. For example, a first software component state may correspond to those software components which are installed on a computer. A second software component state may correspond to all those components which are available for download and installation. A software component classification may be defined which represents a collection of the software components included in both of the foregoing states and provides information regarding this collection. The summary information displayed in a gadget state for this software component classification may include an integer value for the number of software components which are currently installed, and a second integer value indicating the number of all software components currently available.

In connection with the foregoing, information regarding various software component classifications and software components included therein may be provided automatically on the desk-top using a fixed amount of screen space in the Windows Sidebar. Furthermore, as will be illustrated in connection with following figures, the gadget may have an expanded form in the undocked mode and a compressed form in the docked mode. The gadget may also display different information for each of the gadget states in accordance with whether the gadget is docked or undocked. Furthermore, as will also be described in following paragraphs, a first number of gadget states may be used to represent information about a software component classification when in docked mode. A second number of gadget states may be used to represent information about the same classification when in undocked mode. The number of gadget states may vary with the information communicated with each gadget state. As will also be described in more detail herein, the gadget may be an interactive object which facilitates output or displaying information to a user as well as performing other processing in response to a user selection of an item included in displayed data of the gadget.

What will now be described are various examples of how the gadget may appear in connection with various gadget states for docked and undocked modes.

Figure 6:
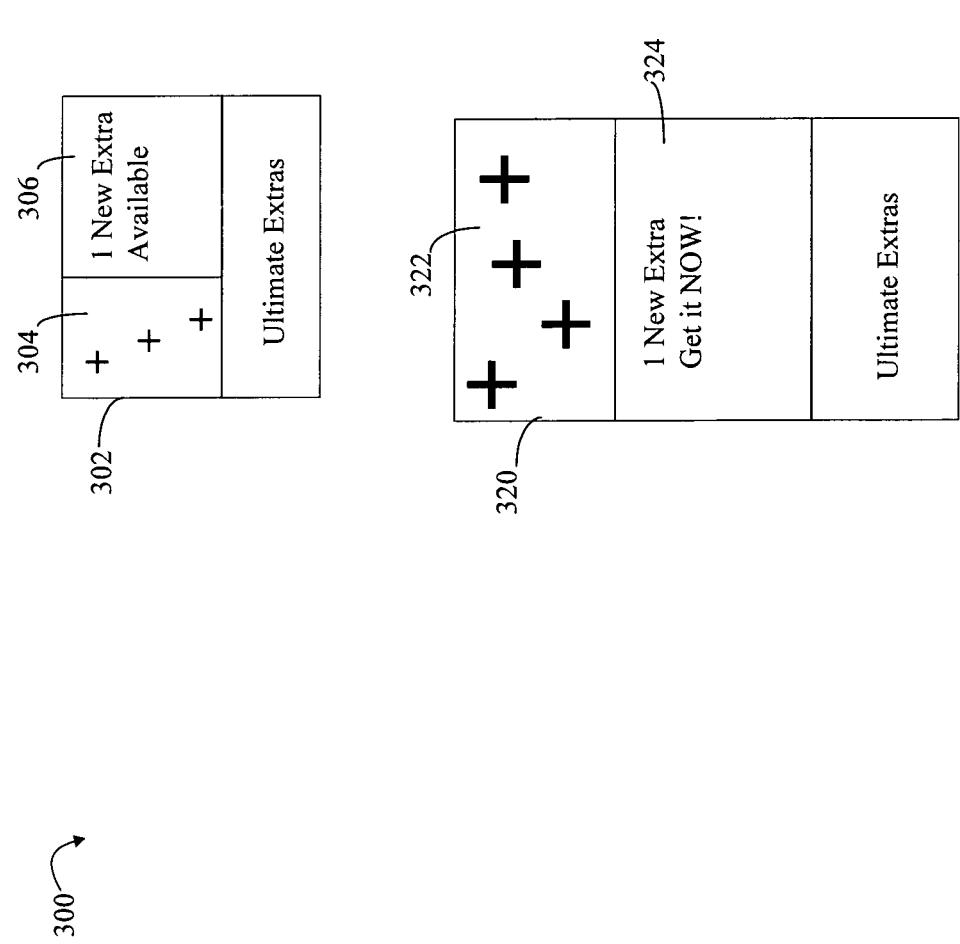
FIGS. 6-8 are examples illustrating various states of the gadget.

Referring now to FIG. 6, shown is a first example representing gadget appearance rendered in connection with gadget states. The example 300 includes representations 302 and 320. The representation 302 illustrates how a gadget may appear in connection with a gadget state when the gadget is in docked mode. The representation 320 illustrates how the gadget may appear in connection with a gadget state when in undocked mode. The example 300 illustrates how a gadget may appear in connection with providing information on new software components, such as Ultimate Extras which have been made recently available such as, for example, within the last month. The gadget may display information providing notification to a user on the desk top that one new Ultimate Extra is available as indicated in 306. One or more areas of the gadget may be used in connection with user input. In this example, area 304 includes a several "+" characters. If the user selects one of these characters, such as with a mouse or other inputs device, an action may be performed. The action may cause the gadget to temporarily pause its cycling through the gadget states. The action may be any one of a variety of different actions such as, for example, providing a text description in another area of the window, navigating to a website or other location where the user may install the new Ultimate Extra or obtain further information regarding the new Ultimate Extra, and the like. The element 320 may represent the undocked or expanded form of the gadget. In connection with element 320, notification information regarding the number of new Ultimate Extras is included in 324. Area 322 may include enlarged "+" characters in comparison to area 304. Area 322 may be used in connection with user input and selection in a manner similar to as described above for area 304 in which selection of a "+" character in area 322 causes an action to be performed.

In one embodiment, the displays in example 300 may correspond to gadget states for a software component classification as described above. The software component classification may not have any other gadget states. Alternatively, an embodiment may also provide a gadget state for each new Ultimate Extra in addition to the gadget state corresponding to the summary information of FIG. 6.

Figure 7:
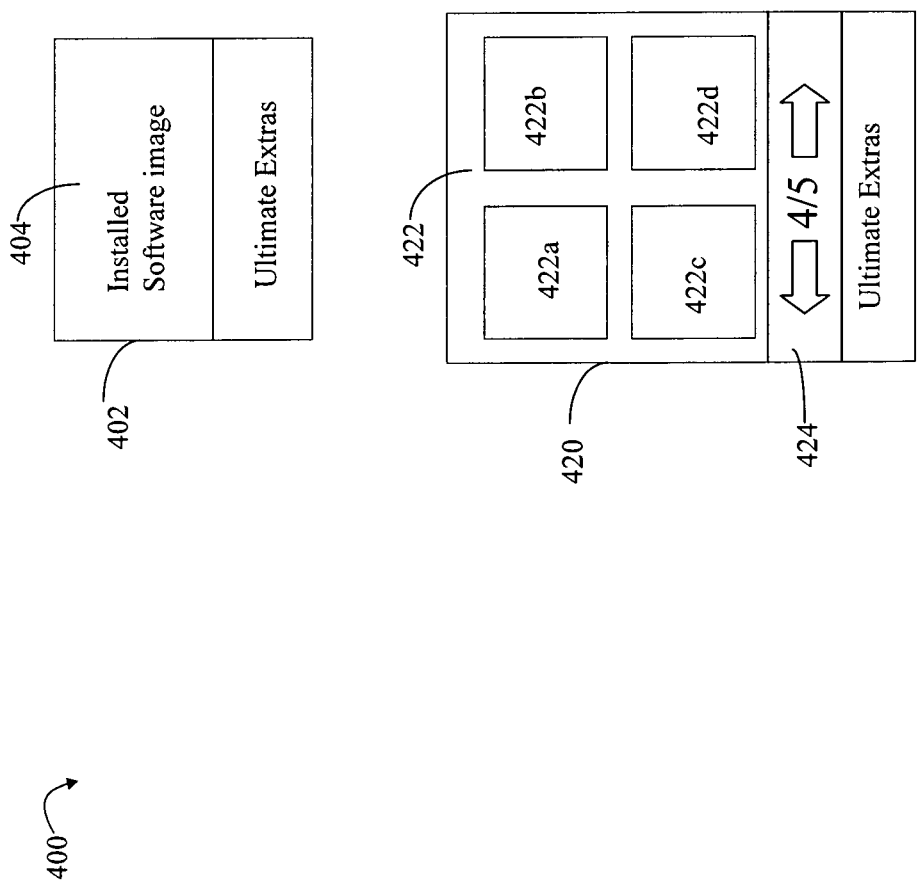

Referring now to FIG. 7, shown is a second example representing gadget appearance rendered in connection with gadget states. The example 400 includes representations 402 and 420. The representation 402 illustrates how a gadget may appear in connection with a gadget state when the gadget is in docked mode. The representation 420 illustrates how the gadget may appear in connection with a gadget state when in undocked mode. The example 400 illustrates how a gadget may appear in connection with providing information regarding installed software components, such as Ultimate Extras which are currently installed on the computer.

In one embodiment when in docked mode, a flip through of displays corresponding to each of the installed Ultimate Extras may be provided. A different display may be rendered for each of the installed Ultimate Extras and may correspond to a different one of the gadget states. For example, if there are 4 installed Ultimate Extras, there are 4 corresponding gadget states when in docked mode each having a different gadget rendering. The representation 402 may correspond to a display for one of the foregoing gadget states. The representation 402 may include a button-sized image or icon 404 for the installed Ultimate Extra or other software component. In one embodiment, selection of the image in area 404 may cause an action to be performed such as, for example, launching the Ultimate Extra, providing a text description of the Ultimate Extra, navigating to a location, such as folder on the system drive, where the files for the Ultimate Extra are stored, and the like.

The representation 422 may provide a different display of information when in undocked mode. The representation 422 includes area 422 in which information is displayed in a 4-up format with 4 images at a time. Each of the images 422a-422d corresponds to a different one of the installed Ultimate Extras. Area 424 provides information regarding the total number of installed Ultimate Extras as well as an indication as to which set of 4 are currently being displayed in area 422. In this example, there is a total of 5 installed Ultimate Extras. The display 422 includes information on the first 4 installed Ultimate Extras. In the undocked mode, the flip through may be performed but rather than display information about a single installed Ultimate Extra for one gadget state, the display 422 corresponds to a gadget state in which information about up to 4 installed Ultimate Extras may be displayed. The next gadget state may display information on the fifth or last installed Ultimate Extra. A user may make a selection in area 422 by selecting one of the displayed images 422a-422d. In response, an action may be performed similar to as described above in connection with selection of the image in area 404. A user may also make a selection in area 424. In one embodiment, the arrows may be selected to modify the gadget state and currently displayed information.

FIG. 7 illustrates use of the techniques herein to provide information regarding a collection of software components. For example, a user may install various software components over a time span of 6 months. The user may not be aware of all the different software components installed and may use the foregoing techniques to easily determine the quantity and particular software components currently installed on the computer. Additionally, depending on the particular action taken in response to a user selection for a software component, the user may be able to easily launch the software component from the desk top, find information on the software component, or perform some other action without the need for invoking other menus, scanning files, and the like.

It should be noted that the foregoing collection concept and technique may be utilized in connection with other software states and associated classifications. It should be noted that although the foregoing display of 420 illustrates a 4-up representation corresponding to 4 Ultimate Extras or other software components, an embodiment may also represent a different number of software components in the undocked or docked mode. Additionally, an embodiment may tailor the number of Ultimate Extras represented by the display or rendering for each gadget state in accordance with the number of Ultimate Extras currently included in the classification, such as the number of Ultimate Extras currently installed.

Figure 8:
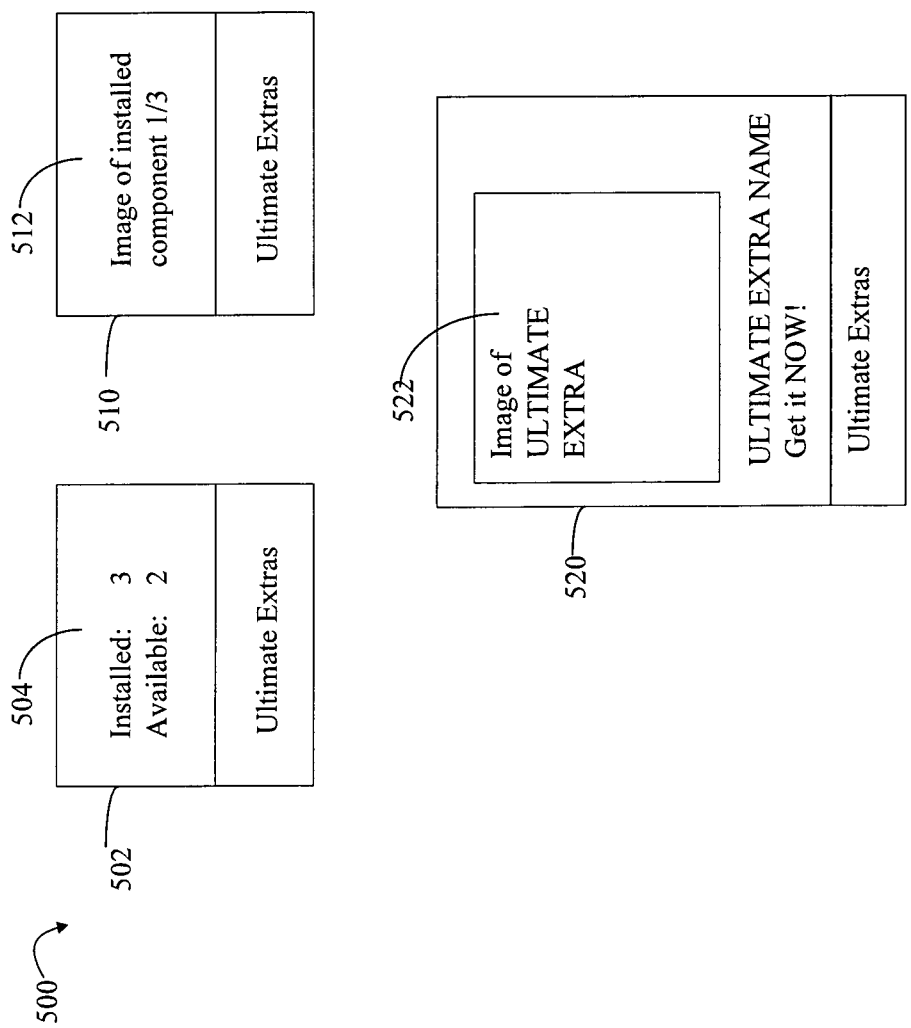

Referring now to FIG. 8, shown is a third example representing gadget appearance rendered in connection with gadget states. The example 500 includes representations 502, 510, and 520. The representation 502 illustrates how a gadget may appear in connection with a gadget state when the gadget is in docked mode. Element 502 may represent a gadget state providing summary information about what Ultimate Extras are installed and also what Ultimate Extras are available but not currently installed. The foregoing may provide notification about Ultimate Extras in total that are available and what portion of those available are installed on the computer. In one embodiment, gadget states may be defined for a classification so that when in docked mode, there is one gadget state providing summary information as in 502 and an individual gadget state for each component in the represented classification. Each such individual gadget state may result in a single rendering of the representation 510. The representation 510 may correspond to a gadget state for a single installed Ultimate Extra. In one embodiment as described, for example, in connection with FIG. 7, a single gadget state may be associated with each installed Ultimate Extra. By cycling through gadget states for this classification, a flip through of the different installed Ultimate Extras may be provided subsequent to a summary display. Selection by a user of the image in area 512 may cause an appropriate action to be taken such as those described in connection with FIG. 7 including, for example, launching the corresponding Ultimate Extra.

Representation 520 illustrates how the gadget may appear when in undocked mode. In this example, when in undocked mode, the gadget cycles through gadget states including an individual gadget state for each installed component. Element 520 represents a display that is associated with each such individual gadget state and which may be rendered for each installed component. In one embodiment, no summary information may be provided in the undocked mode. Thus, in this example, the number of gadget states defined for the docked mode may include one more gadget state than those defined for the undocked mode. Selection of the image in area 522 may result in an action taken similar to the action taken in response to selection of the image in area 512.

It should be noted that both FIGS. 7 and 8 illustrate a different number of gadget states for docked mode than undocked mode for a same classification.

Figure 9:
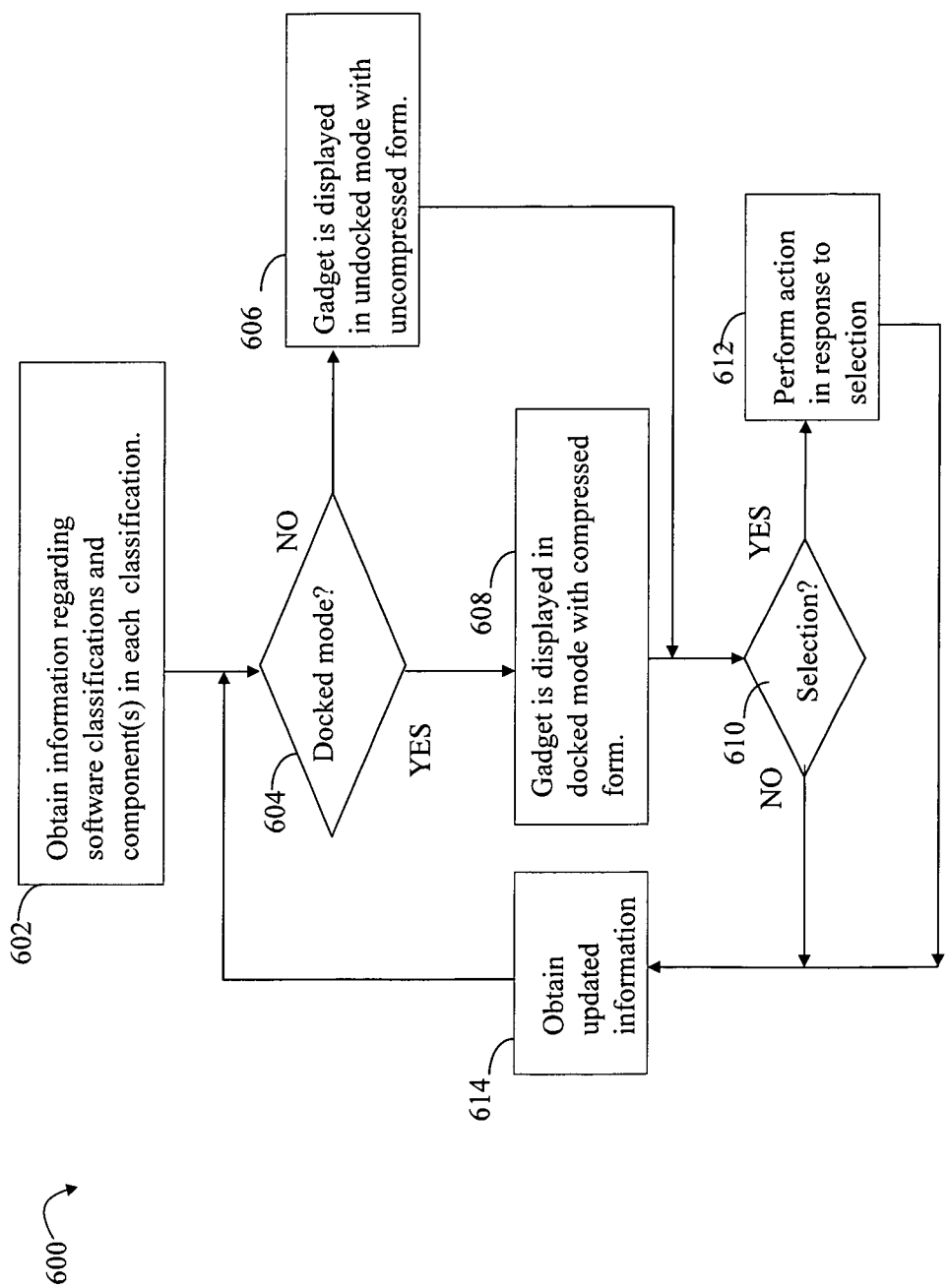
FIG. 9 is a flowchart of processing steps that may be performed in an embodiment in connection with the techniques herein.

Referring now to FIG. 9, shown is an example flowchart of processing steps that may be performed in an embodiment utilizing the techniques herein. The flowchart 600 summarizes processing steps described elsewhere herein. At step

602, information regarding the different software classifications and components in each classification may be obtained.

Information regarding the software classifications and the components included in each such classification may be obtained using any one or more different techniques that may vary with functionality provided in an embodiment as well as the particular classification. For example, one embodiment may provide an API to query and return information regarding a particular software classification such as what software components are installed on the computer system, what components are available, what components are new, what components are expected to be available at a future date, and the like. In the foregoing, the details of how to obtain information about the particular classification may be left to the operating system or other underlying component. In connection with obtaining information about installed software components, an API may be provided which examines the contents of an installation file included locally on the computer. The installation file may be stored in a known location, such as a particular file or folder with a predetermined name. The installation file may indicate what software is installed on the computer. The file may be maintained and updated with each new software installation and/or download. In another embodiment, the API may alternatively communicate with another server or website to obtain information about the installed software, currently available software, software expected to become available, and the like. The server may maintain a database or other data store of information regarding the software components. The server may be queried for particular information which is returned in response. In the event an API is not available to provide the necessary information for use in connection with the techniques herein, it will be appreciated by those skilled in the art that code may be written using any one of a variety of different programming languages and associated techniques in accordance with the functionality available in an embodiment. With reference to FIG. 3, for example, a user of a device may be registered using the registration module 146. When the user installs different software components, the server may track the installations for the user. At a later time, the server may be queried to obtain information regarding the various installations on the user's computer.

At step 604, a determination is made as to whether the gadget is in docked mode. If step 604 evaluates to yes, control proceeds to step 608 where the current gadget state is rendered in accordance with the compressed form associated with docked mode. Control proceeds to step 610. If step 604 evaluates to no, control proceeds to step 606 where the gadget state is rendered in accordance with the expanded form associated with undocked mode. Control proceeds to step 610. At step 610, a determination is made as to whether the user has made a selection if the currently rendered gadget state provides for user input and taking a responsive action. If step 610 evaluates to no, control proceeds to step 614 where updated information regarding the software classifications and components may be obtained. Control then proceeds to step 604. If step 610 evaluates to yes, control proceeds to step 612 to perform an action in accordance with the user input selection. Various actions are described herein. Control proceeds to step 614.

It should be noted that updated information about the software component classifications and associated software components may be obtained at various time periods other than as illustrated in steps FIG. 9. These and other variations will be appreciated by those skilled in the art.

The processing steps of FIG. 9 may be performed by the coding logic associated with the gadget or other object utilized in connection with the techniques herein.

The functionality of the gadget as described herein may also be integrated for use with other applications or components and associated information. An example will now be set forth regarding FIG. 10.

Figure 10:
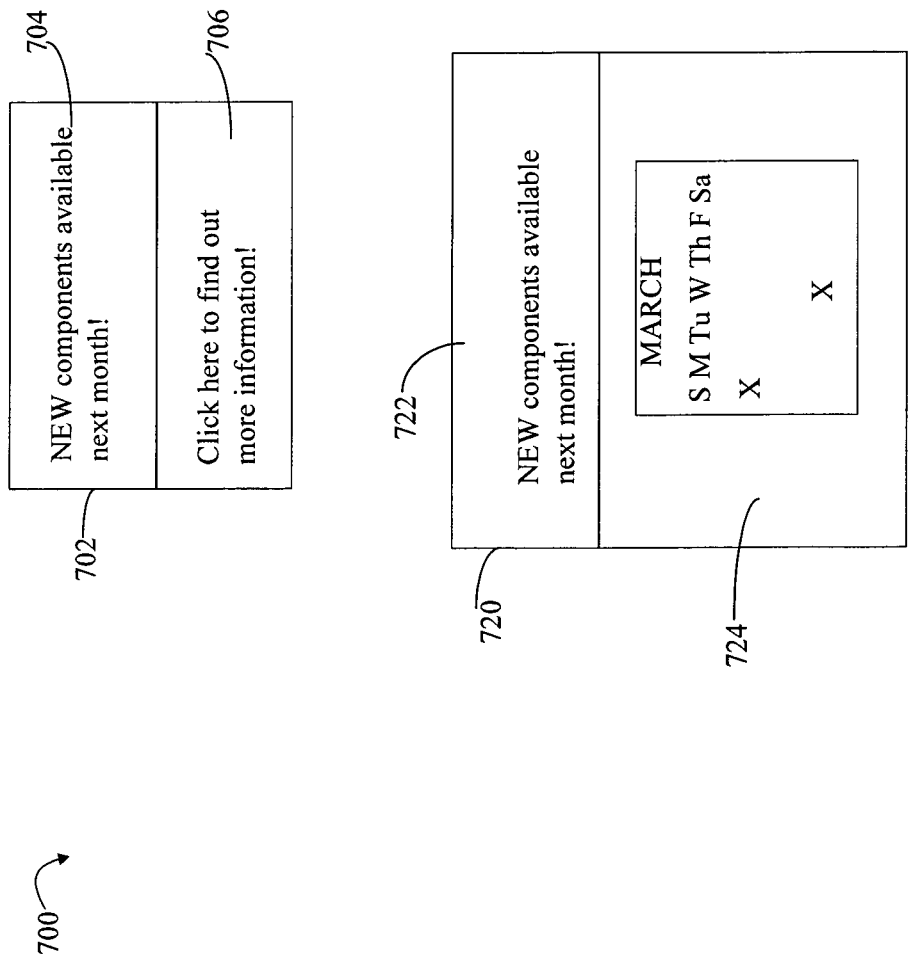
FIG. 10 is another example illustrating a gadget integrating electronic calendar information.

Referring now to FIG. 10, shown is yet another example representing gadget appearance rendered in connection with a gadget state. The example 700 includes a representation 702 illustrating how a gadget may appear when the gadget is in docked mode for the software component classification of software components which are not yet available for installation and download. Rather the components included in this classification are expected to be available for download and installation next month as indicated in area 704. Selection of an image or other item displayed in area 706 may cause an action to be performed such as, for example, navigate to a website location with information regarding the upcoming components. Element 702 may represent a gadget state providing summary information about what Ultimate Extras are due out next month. In one embodiment, a single gadget state represented by the rendering of FIG. 10 may be associated with the software component classification when in docked mode. Element 722 may represent a gadget rendering when in undocked mode with information displayed in area 722. Area 724 may include a calendar with information overlayed thereon to indicate the dates in the next month that the upcoming software components are expected to become available. In this example, the "X" may indicate the expected availability dates. Selection of one of the "X" indicators in area 724 may result in performance of an action, for example, displaying further information regarding the associated software component, navigation to a website or other location with additional information about the associated software component, and the like. Selection of one of the "X" indicators may also result in a user being queried as to whether to integrate calendar information associated with the selected "X" indicator with other calendar information such as personal calendar information. An embodiment may also include an option which provides for integration of all the calendar information regarding the upcoming software components with personal calendar information. As a further example, a gadget may be a clock or other time piece with calendaring and associated calendar information integrated therewith. The associated calendar information may include a user's personal calendar information as well as other calendar information regarding the Ultimate Extras or other software components.

As a variation of the techniques herein, an option may be provided allowing for a gadget configuration in which the gadget may cycle through various gadget state renderings as described herein. As an alternative, the foregoing cycling behavior may be disabled causing the gadget to function in accordance with alternative gadget states. If the cycling behavior is disabled, the gadget may become active for a short time period only when a new Ultimate Extra or other software component becomes available. Otherwise, the gadget is inactive. When inactive, the gadget may be have a first display or appearance, for example, the gadget may appear as grayed out and without color. When the gadget becomes active, the gadget may appear as a color image, flashing, in bold, or some other visually different representation in contrast to the appearance associated with the inactive gadget. The active appearance may be maintained for a time period such as, for example, 24 hours. After the time period, the gadget becomes inactive. The visual appearance and rendering of the gadget in the active state may provide notification to a user that a new software component is available. After a time period if the user does not select to install the new component such as by interacting with the gadget as described elsewhere herein, it may be understood that the user does not want to install the new component.

In connection with the foregoing, various exemplary actions are described that may be performed in response to a user selection provided using a gadget. For example, if a gadget is communicating information regarding a software component which is available but not installed, selection of a displayed image for a software component may result in initiation of processing to install the component, navigation to a website from which the component may be installed and provides information about the component, and the like. If the gadget is communicating information regarding a software component that is already installed, selection of an item displayed may result in navigation to where the component is installed on the computer, launching the software component, and the like. The foregoing and others provided herein are example actions that may be performed.

As also described herein, the gadget may be integrated with other applications and associated data. One example is described herein in connection with integration of calendar information for software expected to become available with personal calendar information.

It should be noted that the information provided regarding software components may be provided with respect to a user-defined context. The context may specify what software components about which the user is notified. In an embodiment, a user may define a context providing for customized or selective notification about particular software. An embodiment may define a default context that may be further customized in accordance with user selection and specification. In one embodiment, the default context may be for notification regarding Windows Ultimate Extras™. Other processing, such as notifications with respect to installed software, may also be performed with respect to the foregoing context. For example, as described herein, the information provided for installed software components may be made with respect to installed Windows Ultimate Extras™.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, at a computer having an operating system, a user-defined context for notifying a user about software components available for installation;
   receiving, at an interactive object installed on the computer, a notification based on the user-defined context regarding one or more software components available for installation, the interactive object having a docked mode that renders the interactive object in a defined area on a desktop display of the computer and an undocked mode that renders the interactive object outside of the defined area on the desktop display of the computer, wherein the one or more software components available for installation are associated with operating system extras made available to owners of the operating system;
   receiving, at the interactive object, information regarding software component classifications and software components included in each software component classification, the software component classifications indicating different installation states including software components installed on the computing device and software components available for installation;
   receiving, at the interactive object, a set of object states for cycling through the information, each object state providing a different rendering of the interactive object for displaying different information, the set of object states including object states for each different software component classification, the object states for each different software component classification including objects states corresponding to the docked mode of the interactive object and object states corresponding to the undocked mode of the interactive object;
   providing, by the interactive object, a flip through of displays for displaying a portion of the information regarding the software components included in a particular software component classification, the flip through of displays provided in accordance with cycling through the object states for the particular software component classification which correspond to the docked mode or the undocked mode of the interactive object as rendered on the desktop display; and
   providing, by the interactive object, a selectable element corresponding to a software component included in the particular software component classification which, when selected, pauses the cycling through the object states and causes performance of an action with respect to the software component included in the particular software component classification.

2. The method of claim 1, wherein:
   the particular software component classification indicates software components available for installation, and
   the software components available for installation include at least one application program.

3. The method of claim 1, wherein the different installation states further include software components previously made available within a defined period of time and software components not yet available for installation but to be released at a future date.

4. The method of claim 1, wherein the defined area is a pane for organizing gadgets on the desktop display of the computer.

5. The method of claim 1, wherein:
   the interactive object, when rendered in the docked mode, is displayed in a compressed form in the defined area on the desktop display, and
   the interactive object, when rendered in the undocked mode, is displayed in an expanded form outside of the defined area and is freely movable on the desktop display.

6. The method of claim 1, wherein:
   the particular software component classification indicates software components available for installation, and
   the action includes performing one or more of: navigating to a location providing additional information about the software component included in the particular software component classification, navigating to a location where one or more files of the software component included in the particular software component classification are stored, downloading the software component included in the particular software component classification, installing the software component included in the particular software component classification, displaying a description of the software component included in the particular software component classification, navigating to a location including options for installing the software component included in the particular software component classification, and launching the software component included in the particular software component classification after installation.

7. The method of claim 1, wherein the interactive object changes the object states for the software component classifications when one or more software components available for installation are installed resulting in a change to content displayed in the interactive object.

8. The method of claim 1, further comprising:
providing, by the interactive object, a flip through of displays for displaying a portion of the information regarding the software components included in a next software component classification by cycling through the object states for the next software component classification which correspond to the docked mode or the undocked mode of the interactive object as rendered on the desktop display.

9. The method of claim 1, further comprising:
cycling through the object states for the particular software component classification which correspond to the docked mode of the interactive object, wherein each display in the flip through of displays provides information about a single software component included in the particular software component classification.

10. The method of claim 1, further comprising:
cycling through the object states for the particular software component classification which correspond to the undocked mode of the interactive object, wherein at least one display in the flip through of displays provides information about multiple software component included in the particular software component classification.

11. The method of claim 3, wherein the interactive object displays the future date at which a software component that is not yet available for installation will be available.

12. The method of claim 11, further comprising:
providing a selectable option in the interactive object to integrate the future date at which the software component that is not yet available for installation will be available with personal calendar information of the user.

13. A computer-readable storage device storing computer-executable instructions that, when executed by a computing device having an operating system, cause the computing device to perform a method comprising:
receiving a user-defined context for notifying a user about software components available for installation;
receiving, at an interactive object installed on the computing device, a notification based on the user-defined context regarding one or more software components available for installation, the interactive object having a docked mode that renders the interactive object in a defined area on a desktop display of the computing device and an undocked mode that renders the interactive object outside of the defined area on the desktop display of the computing device, wherein the one or more software components available for installation are associated with operating system extras made available to owners of the operating system;
receiving, at the interactive object, information regarding software component classifications and software components included in each software component classification, the software component classifications indicating different installation states including software components installed on the computing device and software components available for installation;
receiving, at the interactive object, a set of object states for cycling through the information, each object state providing a different rendering of the interactive object for displaying different information, the set of object states including object states for each different software component classification, the object states for each different software component classification including objects states corresponding to the docked mode of the interactive object and object states corresponding to the undocked mode of the interactive object;
providing, by the interactive object, a flip through of displays for displaying a portion of the information regarding the software components included in a particular software component classification, the flip through of displays provided in accordance with cycling through the object states for the particular software component classification which correspond to the docked mode or the undocked mode of the interactive object as rendered on the desktop display; and
providing, by the interactive object, a selectable element corresponding to a software component included in the particular software component classification which, when selected, pauses the cycling through the object states and causes performance of an action with respect to the software component included in the particular software component classification.

14. A computing device comprising:
a processor; and
memory storing an operating system and computer-executable code implementing a method comprising:
receiving a user-defined context for notifying a user about software components available for installation;
receiving, at an interactive object installed on the computing device, a notification based on the user-defined context regarding one or more software components available for installation, the interactive object having a docked mode that renders the interactive object in a defined area on a desktop display of the computing device and an undocked mode that renders the interactive object outside of the defined area on the desktop display of the computing device, wherein the one or more software components available for installation are associated with operating system extras made available to owners of the operating system;
receiving, at the interactive object, information regarding software component classifications and software components included in each software component classification, the software component classifications indicating different installation states including software components installed on the computing device and software components available for installation;
receiving, at the interactive object, a set of object states for cycling through the information, each object state providing a different rendering of the interactive object for displaying different information, the set of object states including object states for each different software component classification, the object states for each different software component classification including objects states corresponding to the docked mode of the interactive object and object states corresponding to the undocked mode of the interactive object;
providing, by the interactive object, a flip through of displays for displaying a portion of the information regarding the software components included in a particular software component classification, the flip through of displays provided in accordance with cycling through the object states for the particular software component classification which correspond to the docked mode or the undocked mode of the interactive desktop object as rendered on the desktop display; and providing, by the interactive object, a selectable element corresponding to a software component included in the particular software component classification which, when selected, pauses the cycling through the object states and causes performance of an action with respect to the software component included in the particular software component classification.

15. The computing device of claim 14, wherein the method further comprises:

cycling through the object states for the particular software component classification which correspond to the docked mode of the interactive object, wherein each display in the flip through of displays provides information about a single software component included in the particular software component classification.

16. The computing device of claim 14, wherein the method further comprises:

cycling through the object states for the particular software component classification which correspond to the undocked mode of the interactive object, wherein at least one display in the flip through of displays provides information about multiple software component included in the particular software component classification.

17. The computing device of claim 14, wherein the different installation states further include software components previously made available within a defined period of time and software components not yet available for installation but to be released at a future date.

18. The computing device of claim 17, wherein the interactive object provides a selectable option to integrate the future date at which the software that is not yet available for installation will be available with personal calendar information of the user.

19. The method of claim 1, wherein:

the particular software component classification indicates software components installed on the computing device, and the action launches the software component included in the particular software component classification.

20. The computer-readable storage device of claim 13, wherein the action includes performing one or more of: downloading the software component included in the particular software component classification, installing the software component included in the particular software component classification, and launching the software component included in the particular software component classification after installation.

* * * * *